United States Patent [19]
Heumann

[11] Patent Number: 5,612,003
[45] Date of Patent: Mar. 18, 1997

[54] FLUIDIZED BED WTIH CYCLONE

[75] Inventor: William L. Heumann, Crestwood, Ky.

[73] Assignee: Fisher-Klosterman, Inc., Louisville, Ky.

[21] Appl. No.: 544,883

[22] Filed: Oct. 18, 1995

[51] Int. Cl.⁶ .............................. B01J 8/18; F27B 15/08; B01D 50/00
[52] U.S. Cl. ...................... 422/139; 422/145; 422/147; 502/41; 55/257.7; 55/337; 55/468
[58] Field of Search .................................. 422/139, 145, 422/147; 502/41; 55/257.7, 337, 468

[56] References Cited

U.S. PATENT DOCUMENTS

| | | | |
|---|---|---|---|
| 3,698,874 | 7/1970 | Zenz. | |
| 4,172,667 | 10/1979 | Zenz et al. | 366/107 |
| 4,591,427 | 5/1986 | Krug et al. | 208/161 |
| 4,640,963 | 2/1987 | Kreider et al. | 526/67 |
| 4,725,409 | 2/1988 | Wolf | 422/145 |
| 4,731,282 | 3/1988 | Dewitz et al. | 422/144 |
| 4,997,800 | 3/1991 | Child | 502/42 |
| 5,174,455 | 12/1992 | Zelazny et al. | 209/29 |
| 5,286,691 | 2/1994 | Harandi et al. | 502/41 |
| 5,372,707 | 12/1994 | Buchanan et al. | 208/161 |
| 5,409,872 | 4/1995 | Raterman | 502/44 |

Primary Examiner—Christopher Kim
Attorney, Agent, or Firm—Wheat, Camoriano, Smith & Beres, PLC

[57] ABSTRACT

A fluidized bed vessel includes a cyclone which has a leg for returning particulate material to the bed, and an eductor at the bottom of the leg for providing the gas to fluidize the bed and for inducing a downward flow in the leg to provide greater particulate separation from the gas in the cyclone.

10 Claims, 3 Drawing Sheets

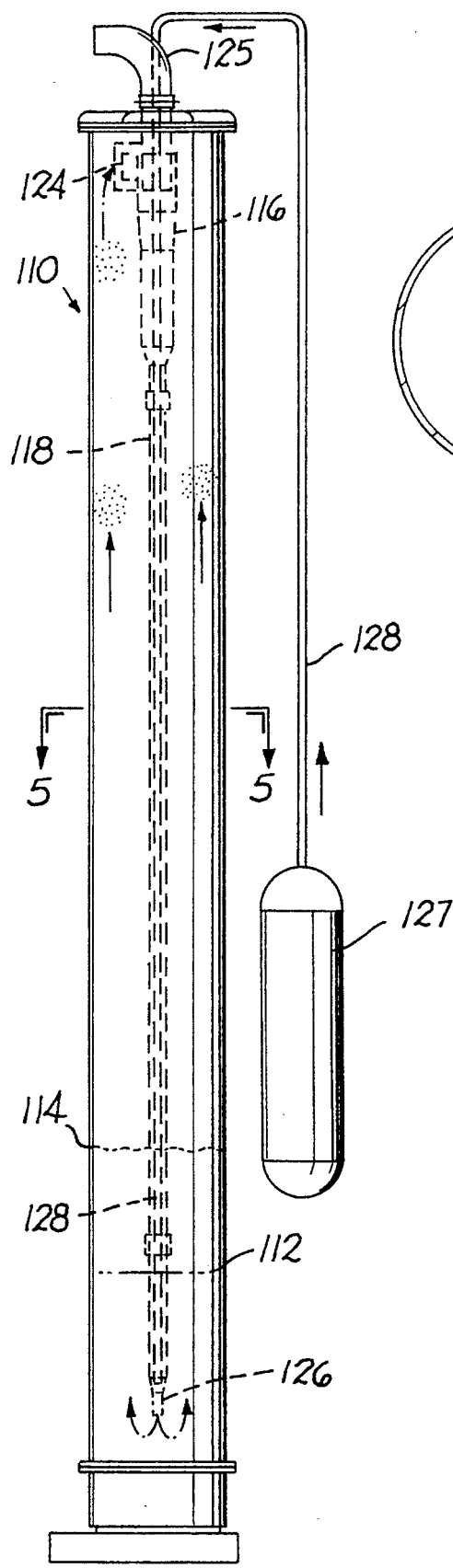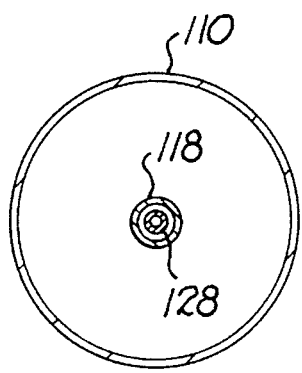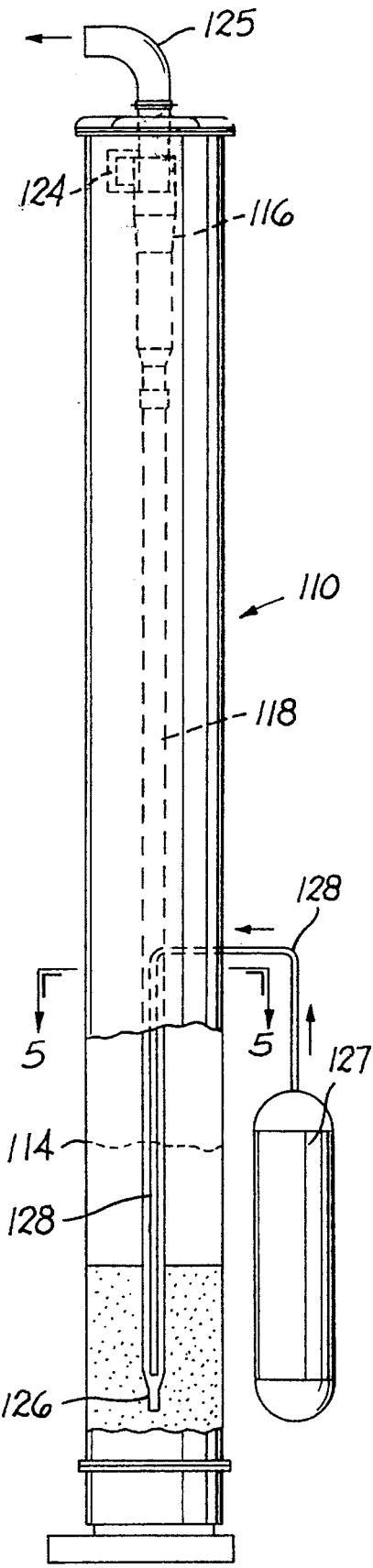
FIG. 2
FIG. 5
FIG. 4

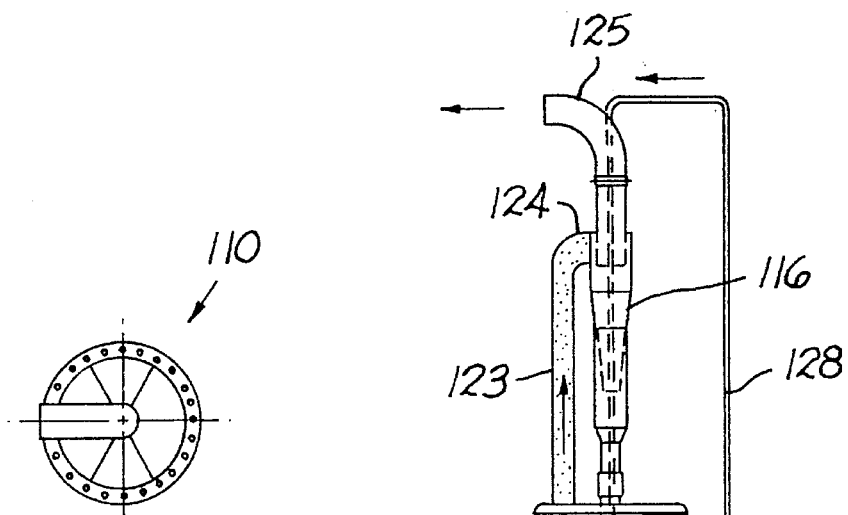
FIG. 7
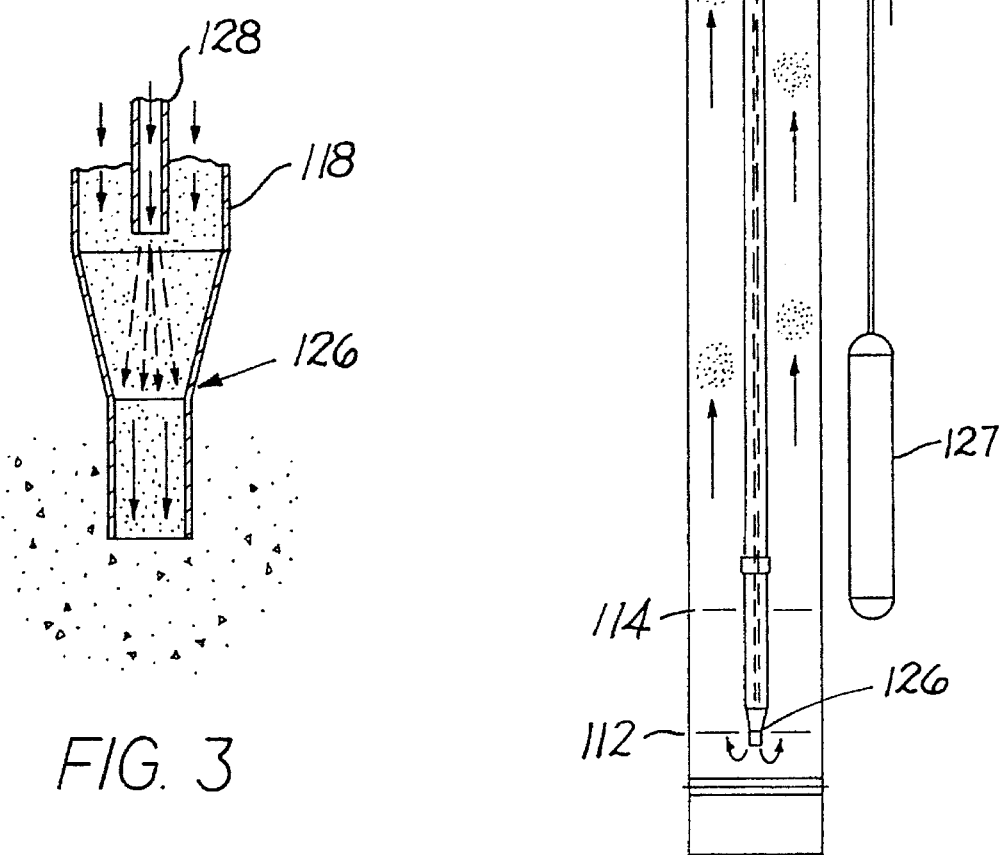
FIG. 3
FIG. 6

5,612,003

FLUIDIZED BED WTIH CYCLONE

BACKGROUND OF THE INVENTION

The present invention relates to a combination of a fluidized bed and a cyclone for separating out particulate material and returning it to the fluidized bed.

In a fluidized bed, some type of particulate material is fluidized by passing gas through it. In general, the particulate material may be a catalyst, a fuel, or a reactant. When the gas is passed through the particulate material, it raises the level of the material in the vessel from the static bed level to the fluidized bed level. The gas tends to carry some particulate matter with it, and it is desirable to separate the particulate matter out of the gas and return it to the fluidized bed before it passes out of the process, both because the particulate material may be expensive, and because it would tend to pollute the atmosphere or foul downstream equipment if it were not collected and returned to the process.

In order to separate the particulate material out of the gas, cyclones are often used. The particulate-laden gas enters the cyclone in a downwardly-rotating manner. The particulate material is thrown outwardly and downwardly, while the relatively clean gas reverses direction and exits the top of the cyclone. Most of the particulate material then passes through a leg of the cyclone and back down into the fluidized bed.

In the prior art, there is usually a flapper valve at the bottom of the leg of the cyclone to prevent the fluidized particles from travelling up from the bed through the bottom of the leg. When enough particulate material goes down the leg and rests against the flapper valve, the weight of the material causes the flapper valve to open, dumping the particulate material into the fluidized bed. There have been many problems with the flapper valves failing to function properly, resulting in particulate material plugging up the dip leg, which results in excessive loss of bed material and possible shut-down of the system.

In the prior art, there is always some sort of gas distribution system near the bottom of the fluidized bed in order to fluidize the bed. This gas distribution system may be expensive to install and maintain. The cyclone system may be mounted internally or externally to the fluid bed vessel.

SUMMARY OF THE INVENTION

A preferred embodiment of the present invention provides a fluidized bed with a cyclone in which the problems with flapper valves or other external devices have been eliminated by eliminating the need for a flapper valve or other external device.

A preferred embodiment of the present invention uses the gas stream for fluidizing the bed to perform two additional functions—to eliminate the need for a flapper valve and to induce a downward flow of gas in the cyclone, which improves the effectiveness of the cyclone.

A preferred embodiment of the present invention provides a cyclone which has an eductor in its leg, so that the gas which fluidizes the bed passes through the eductor, preventing particles from travelling up the leg and inducing a downward flow of gas in the leg to help improve particle separation from the gas stream in the cyclone.

By using the eductor in the dip leg to fluidize the bed, the need for a separate distribution system for introducing gas to fluidize the bed is eliminated.

BRIEF DESCRIPTION OF THE DRAWINGS

FIG. 2 is a schematic front view of a first embodiment of a fluidized bed made in accordance with the present invention;

FIG. 3 is an enlarged front sectional view of the eductor portion of the vessel of FIG. 2;

FIG. 4 is a schematic front view of a second embodiment of a fluidized bed made in accordance with the present invention, with the bottom portion in section;

FIG. 5 is a view taken along the section 5—5 of FIGS. 2 and 4;

FIG. 6 is a schematic front sectional view of a third embodiment of a fluidized bed made in accordance with the present invention; and FIG. 7 is a top view of the bed of FIG. 6.

DESCRIPTION OF THE PREFERRED EMBODIMENTS

Figure 1:
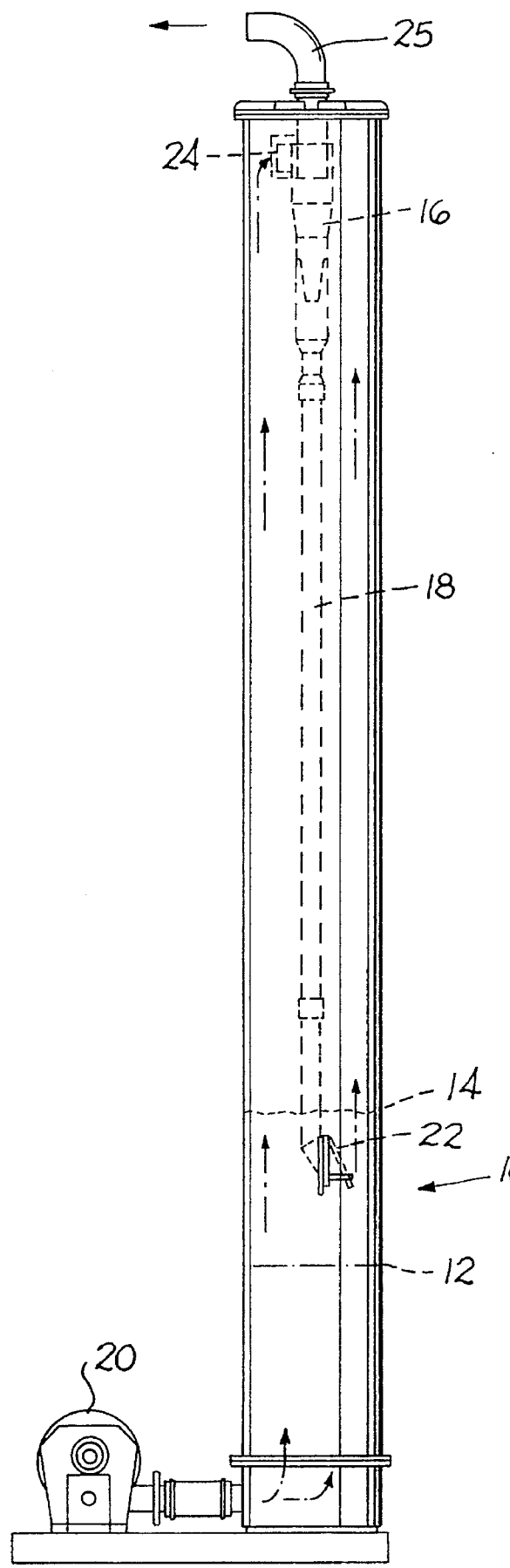
FIG. 1 is a schematic front view of a prior art fluidized bed.

FIG. 1 shows a prior art fluidized bed 10 defining a static bed level 12 and a fluidized bed level 14. There is a cyclone 16 in the vessel 10 which has a leg 18 to carry particulates back to the fluidized bed. A compressor 20 provides pressurized air to the bottom of the vessel 10. The air goes into a pipe (not shown) at the bottom of the vessel, and exits through some type of distributor (not shown), lifting up the particles in the bed, fluidizing the bed, and raising the level of the particles from the static bed level 12 to the fluidized bed level 14. There is a flapper valve 22 at the bottom of the leg 18, which opens when the weight of particles on it is great enough to cause it to open, but which closes otherwise, to prevent the particles in the fluidized bed from passing up through the bottom of the leg 18.

The air which enters the bottom of the vessel 10 and fluidizes the bed then passes upwardly (carrying some particulate material with it) and enters the cyclone 16 at the opening 24. Most of the particulate material drops down the leg 18 and is returned to the bed, while the air goes on out the pipe 25 at the top of the vessel 10.

As was explained earlier, there have been problems with the flappers 22 or other external devices for preventing the flow of particulates up the leg 18 in these fluidized beds. Also, it is always desirable to get good separation of particulate material from the gas stream, so engineers are always working to improve the design of the cyclones to try to get the best possible separation. It is common, for example, to use two or three cyclones connected together in series to achieve the desired separation.

Looking now at FIGS. 2, 3, and 5, there is a preferred embodiment of the present invention. (Parts of the embodiments of the present invention are numbered to correspond to the same parts in the prior art embodiment of FIG. 1, when possible.) In this preferred embodiment is a fluidized bed vessel 110, defining a static bed level 112 and a fluidized bed level 114, as in the prior art. There is also a cyclone 116, which separates the particulate material from the gas that was used to fluidize the bed.

However, there are some differences from the prior art which should be noted. For example, at the bottom of the leg 118, there is no external device, such as a flapper valve, to prevent bubbles of particles from entering the dip leg from the bottom. Instead, there is an eductor 126, which allows gas to blow out the bottom of the leg 118, carrying particulate material with it. The eductor 126 receives pressurized gas from a pressurized gas line 128, which terminates at an opening before the end of the eductor 126 and is spaced inwardly from the walls of the eductor 126 to provide room for gas and particles to pass downwardly through the leg 118 and out through the eductor 126. The flow of gas out the end of the gas line 128 and out the eductor 126 induces a downward flow of gas in the leg 118, which greatly improves the particle separation in the cyclone 116. (However, it may still be necessary to connect cyclones in series, even when using the present invention.)

Also, instead of having gas come in through a distributor in the bottom of the vessel to fluidize the bed, the gas leaving the eductor 126 passes out into the particles in the bottom of the bed and fluidizes the bed. So, in the present design, the gas which is used to fluidize the bed serves two additional functions which it did not serve before. It eliminates the need for a flapper valve or other external device and the problems that were encountered with external devices, and it improves the functioning of the cyclone 116, because it induces a downward flow of gas in the cyclone itself, which causes more particulate material to go down the leg 118 and less to go out the pipe 125 at the top of the vessel 110. Also, since the eductor serves as the gas distributor, it eliminates the need for the usual gas distributor.

In the embodiment shown in FIGS. 2, 3, and 5, the pressurized gas line 128 comes from a tank or other source of pressurized gas 127, enters the vessel 110 through the top, and passes down through the center of the cyclone 116 and the center of the leg 118 to the eductor 126. However, it is not necessary for the pressurized gas line 128 to take that path. FIG. 4 shows a second embodiment, in which the pressurized gas line 128 enters the side of the vessel 110 and the side of the leg 118 and then extends down through the center of the leg 118 to the eductor 126. Regardless of how the pressurized gas reaches the eductor, it serves two functions it did not serve before in addition to fluidizing the bed. It prevents particles from flowing up the leg 118, thereby eliminating the need for a valve in the leg 118, and it induces the flow of gas down the leg 118, which makes the cyclone more effective at separating particles from the gas stream.

FIGS. 6 and 7 show another alternative embodiment, in which the cyclone is located outside of the fluidized bed vessel 110. In that case, the particulate material and gas leave the vessel 110 through a pipe 123, enter the cyclone 116 through the opening 124, and then the particulate material passes down through the leg 118 and back to the bed while the gas leaves through the pipe 125 at the top of the cyclone. In this embodiment, as in the previous embodiments, there is a source 127 of pressurized gas, and the pressurized gas passes through an eductor 126, helping to draw particulate material down the leg 118 and preventing material in the fluidized bed from entering the bottom of the leg 118. This pressurized gas passing through the eductor 126 also serves to fluidize the particulate material in the bed.

While all of these embodiments show the eductor being at the very end of the leg 118 and being a part of the leg 118, it would be possible for the eductor to be located above the end of the leg 118 or for the eductor to be a separate member inside the leg while still serving the same purpose.

It will be obvious to those skilled in the art that modifications may be made to the embodiments described above without departing from the scope of the present invention.

What is claimed is:

1. A fluidized bed, comprising:
   a vessel,
   a cyclone cooperating with said vessel for separating out particulate material and returning the material to the fluidized bed,
   a leg extending down from said cyclone for returning the particulate material to the fluidized bed;
   an eductor at a lower portion of said leg, said eductor having an exit end; and
   a pressurized gas line within the leg having an opening before the exit end of said eductor so as to blow gas through said eductor and out of said leg, wherein said pressurized gas flowing out of said eductor creates a gas stream near the bottom of said vessel which fluidizes the bed and induces a downward air flow in said leg to help pull particulate matter down said leg.

2. A fluidized bed as recited in claim 1, wherein said pressurized gas line enters the vessel at the top and extends down through said leg.

3. A fluidized bed as recited in claim 1, wherein said pressurized gas line enters the side of the vessel.

4. A cyclone and fluid bed combination, comprising:
   a fluidized bed vessel;
   a cyclone in fluid communication with said vessel in order to receive gas and entrained particulate material from said vessel;
   a leg projecting downwardly from said cyclone so as to return particulate material to the lower portion of said vessel;
   an eductor at a lower portion of said leg;
   a pressurized gas line within said leg near said eductor such that, when pressurized gas flows through said gas line and through said eductor, said pressurized gas provides the primary source of gas for fluidizing the bed and induces a downward flow in said leg to help carry particulate material down said leg.

5. A cyclone and fluid bed combination as recited in claim 4, wherein said gas line enters said vessel at the top and extends down through the center of said leg.

6. A cyclone and fluid bed combination as recited in claim 4, wherein said gas line enters said vessel from the side and terminates near the bottom of said leg.

7. A method for operating a fluidized bed, comprising the steps of:
   providing a cyclone to separate particulate material from gas in a fluidized bed, said cyclone including a leg to return particulates to the bed;
   providing an eductor at a lower portion of said leg;
   providing a pressurized gas stream into the leg which leaves the eductor at the lower portion of the leg, so as to prevent particles from passing up into the leg from the fluidized bed and so as to induce a flow of gas down the leg; and
   using the pressurized gas stream which leaves the eductor to fluidize the bed.

8. A method for operating a fluidized bed as recited in claim 7, wherein the pressurized gas stream which leaves the leg is the only source of compressed gas used to fluidize the bed.

9. A cyclone and fluid bed combination, comprising:
   a fluidized bed vessel;
   a cyclone having an inlet in fluid communication with said vessel;

a leg projecting downwardly from said cyclone so as to return particulate material to the lower portion of said vessel;

a pressurized gas line to said leg;

an eductor in said leg, such that said pressurized gas blows through said eductor, drawing gas and particulate matter down said leg, wherein said pressurized gas leaves said leg at the bottom of said leg, thereby providing the primary source of pressurized gas to fluidize the bed.

10. A cyclone and fluid bed combination as recited in claim 9, and further comprising an eductor in said leg, such that said pressurized gas blows through said eductor, drawing gas and particulate matter down said leg.

* * * * *